(12) United States Patent
Takasaki

(10) Patent No.: US 10,424,983 B2
(45) Date of Patent: Sep. 24, 2019

(54) STATOR FOR ROTARY ELECTRIC MACHINE

(75) Inventor: Akira Takasaki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 468 days.

(21) Appl. No.: 14/347,046

(22) PCT Filed: Sep. 6, 2012

(86) PCT No.: PCT/IB2012/001723
§ 371 (c)(1),
(2), (4) Date: Mar. 25, 2014

(87) PCT Pub. No.: WO2013/045986
PCT Pub. Date: Apr. 4, 2013

(65) Prior Publication Data
US 2014/0232223 A1    Aug. 21, 2014

(30) Foreign Application Priority Data

Sep. 26, 2011    (JP) ................................. 2011-208921

(51) Int. Cl.
*H02K 3/28* (2006.01)
*H02K 3/50* (2006.01)

(52) U.S. Cl.
CPC .................. *H02K 3/28* (2013.01); *H02K 3/50* (2013.01); *H02K 2203/09* (2013.01)

(58) Field of Classification Search
CPC ............ H02K 3/28; H02K 5/22; H02K 5/225; H02K 3/50; H02K 3/505; H02K 3/51; H02K 3/52; H02K 3/522; H02K 2203/09

USPC ...................................................... 310/71, 43
See application file for complete search history.

(56) References Cited

U.S. PATENT DOCUMENTS

| 4,219,748 | A | * | 8/1980 | Sakaguchi | H02K 3/50 |
| | | | | | 310/260 |
| 4,710,662 | A | * | 12/1987 | Balke | H02K 3/16 |
| | | | | | 310/204 |
| 4,933,587 | A | | 6/1990 | Tanaka | |
| 5,233,246 | A | * | 8/1993 | Yockey | H02K 5/225 |
| | | | | | 310/68 D |
| 6,369,473 | B1 | | 4/2002 | Baumeister et al. | |
| 2002/0033649 | A1 | * | 3/2002 | Oohashi | H02K 3/28 |
| | | | | | 310/184 |

(Continued)

FOREIGN PATENT DOCUMENTS

| DE | 10 2007 040 809 A1 | 3/2009 |
| EP | 1 050 948 A2 | 11/2000 |

(Continued)

*Primary Examiner* — Quyen P Leung
*Assistant Examiner* — Robert E Mates
(74) *Attorney, Agent, or Firm* — Finnegan, Henderson, Farabow, Garrett & Dunner, LLP

(57) ABSTRACT

A bus bar extended end portion of a bus bar that projects from a main body of a bus bar module and a coil conductor extended end portion extend in the same direction, and are disposed adjacent to each other. The respective distal ends of the coil conductor extended end portion and the bus bar extended end portion are welded to each other. The coil conductor extended end portion and the bus bar extended end portion are also fixed to each other at a position away from the weld.

10 Claims, 5 Drawing Sheets

(56) References Cited

U.S. PATENT DOCUMENTS

| | | | | |
|---|---|---|---|---|
| 2002/0047365 | A1* | 4/2002 | Yagyu | H02K 3/50 |
| | | | | 310/71 |
| 2003/0201688 | A1* | 10/2003 | Yamamura | H02K 3/50 |
| | | | | 310/71 |
| 2004/0251752 | A1* | 12/2004 | Shinzaki | H02K 3/522 |
| | | | | 310/71 |
| 2005/0253466 | A1 | 11/2005 | Seguchi et al. | |
| 2006/0163959 | A1* | 7/2006 | Ogawa | H02K 3/38 |
| | | | | 310/71 |
| 2008/0018193 | A1* | 1/2008 | Kobayashi | H02K 3/522 |
| | | | | 310/219 |

FOREIGN PATENT DOCUMENTS

| | | |
|---|---|---|
| EP | 1 881 584 A2 | 1/2008 |
| EP | 2 244 358 A1 | 10/2010 |
| JP | 2005-328661 | 11/2005 |
| JP | 2006-211810 | 8/2006 |
| JP | 2009-106008 | 5/2009 |

* cited by examiner

STATOR FOR ROTARY ELECTRIC MACHINE

CROSS-REFERENCE TO RELATED APPLICATIONS

This application is a national phase application of International Application No. PCT/162012/001723, filed Sep. 6, 2012, and claims the priority of Japanese Application No. 2011-208921, filed Sep. 26, 2011, the content of both of which is incorporated herein by reference.

BACKGROUND OF THE INVENTION

1. Field of the Invention

The present invention relates to a stator for a rotary electric machine, and in particular to the structure for connection of coil conductors of the stator.

2. Description of Related Art

Electric motors that convert electric energy into rotational kinetic energy, electric generators that convert rotational kinetic energy into electric energy, and electric devices that function both as an electric motor and as an electric generator are known. Such electric devices are hereinafter referred to as "rotary electric machines".

A rotary electric machine includes two members that are disposed coaxially to rotate relative to each other. Normally, one of the members is fixed, and the other member rotates. A coil is disposed on the fixed member (stator). The coil is supplied with electric power to generate a rotating magnetic field. The other member (rotor) is rotated through interaction with the magnetic field. The coil which is disposed on the stator is formed, for example, by mounting a plurality of partial coils on the stator and thereafter connecting the partial coils. To distinguish the individual coils before being connected from the entire coil after being connected, the former and the latter will hereinafter be referred to as "partial coils" and a "coil group", respectively.

Japanese Patent Application Publication No. 2009-106008 (JP-2009-106008-A) discloses a stator for a rotary electric machine in which partial coils mounted on each of teeth of the stator are connected to each other by bus bars that are conductors that are different from coil conductors that form the partial coils. A plurality of bus bars are housed in a holding member to be integrated with each other to form a bus bar module. The coil conductor extends in the direction away from the partial coil. A part of the bus bar is disposed along the coil conductor. The respective distal ends of the coil conductor and the bus bar are welded to each other to connect between the partial coils.

SUMMARY OF THE INVENTION

In JP-2009-106008-A, the point of connection (welded portion) between the coil conductor and the bus bar is located at the respective distal ends of the coil conductor and the bus bar that extend in the direction away from the partial coil and a main body of the bus bar module. Therefore, a stress concentrates on the point of connection when the main body of the bus bar module vibrates. A reason for extending the coil conductor and the part of the bus bar in the direction away from the partial coil is to prevent the transmission of welding heat to the stator and the integrated bus bars.

The present invention provides a stator for a rotary electric machine that suppresses stress concentration on the point of connection between a coil conductor and a bus bar.

A stator for a rotary electric machine according to an aspect of the present invention includes a stator core; a plurality of partial coils formed from coil conductors; and a plurality of bus bars connecting the coil conductors of the partial coils to form a coil group. The plurality of partial coils are mounted on the stator core. The plurality of bus bars are integrated with each other to form a module main body. The plurality of bus bars include end portions extending from one side surface of the module main body and a side surface of the module main body opposite to the one side surface. The module main body is disposed adjacent to the coil group in a rotational axis direction of the rotary electric machine. The coil conductors include a conductor extended portion provided at end portions of the coil conductors to extend in the rotational axis direction and in a direction away from the coil group. The bus bars include a bus bar extended portion provided at the end portions of the bus bars to extend in the rotational axis direction and in the direction away from the coil group. The conductor extended portion and the bus bar extended portion are disposed adjacent to each other. The conductor extended portion and the bus bar extended portion include a weld provided between the conductor extended portion and the bus bar extended portion. The conductor extended portion and the bus bar extended portion are adhered to each other with a resin at a position away from the weld, or brought into tight contact with each other with a resin solidified in conformity to a surface of the bus bar extended portion at a position away from the weld to support the module main body by the conductor extended portion.

In the stator, the resin may be a resin that coats the coil conductors. In the stator, the resin may be used for adhesion at a position away from the weld.

In the stator, a position in the rotational axis direction at which the conductor extended portion and the bus bar extended portion are adhered to each other, or a position in the rotational axis direction at which the module main body is supported by the conductor extended portion, may overlap a position of the module main body in the rotational axis direction.

A stator for a rotary electric machine according to another aspect of the present invention includes a stator core; a plurality of partial coils formed from coil conductors; and a plurality of bus bars connecting the coil conductors of the partial coils to form a coil group. The plurality of partial coils are mounted on the stator core. The plurality of bus bars are integrated with each other to form a module main body. The plurality of bus bars including end portions extending from the module main body. The module main body is disposed adjacent to the coil group. The coil conductors include a conductor extended portion provided at end portions of the coil conductors to extend in a direction away from the coil group. The bus bars include a bus bar extended portion provided at the end portions of the bus bars. The bus bar extended portion extends along the conductor extended portion in the same direction as the direction of the conductor extended portion. The conductor extended portion and the bus bar extended portion include a weld provided between the conductor extended portion and the bus bar extended portion. The conductor extended portion and the bus bar extended portion are fixed to each other at a position away from the weld.

In the stator, the coil conductor extended portion and the bus bar extended portion may be fixed to each other by adhesion with a resin at a position away from the weld. In the stator, the conductor extended portion and the bus bar extended portion may be fixed to each other by adhesion with a resin that coats the coil conductors.

In the stator, a position at which the conductor extended portion and the bus bar extended portion are fixed to each other in a direction of the conductor extended portion may overlap a position of the module main body in the extending direction of the conductor extended portion.

In the stator, an end portion of the conductor extended portion and an end portion of the bus bar extended portion may be welded to each other at the weld.

With a coil conductor extended portion and a bus bar extended portion adhered or fixed to each other at a position away from a position at which the coil conductor extended portion and the bus bar extended portion welded to each other, stress concentration on the weld can be suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
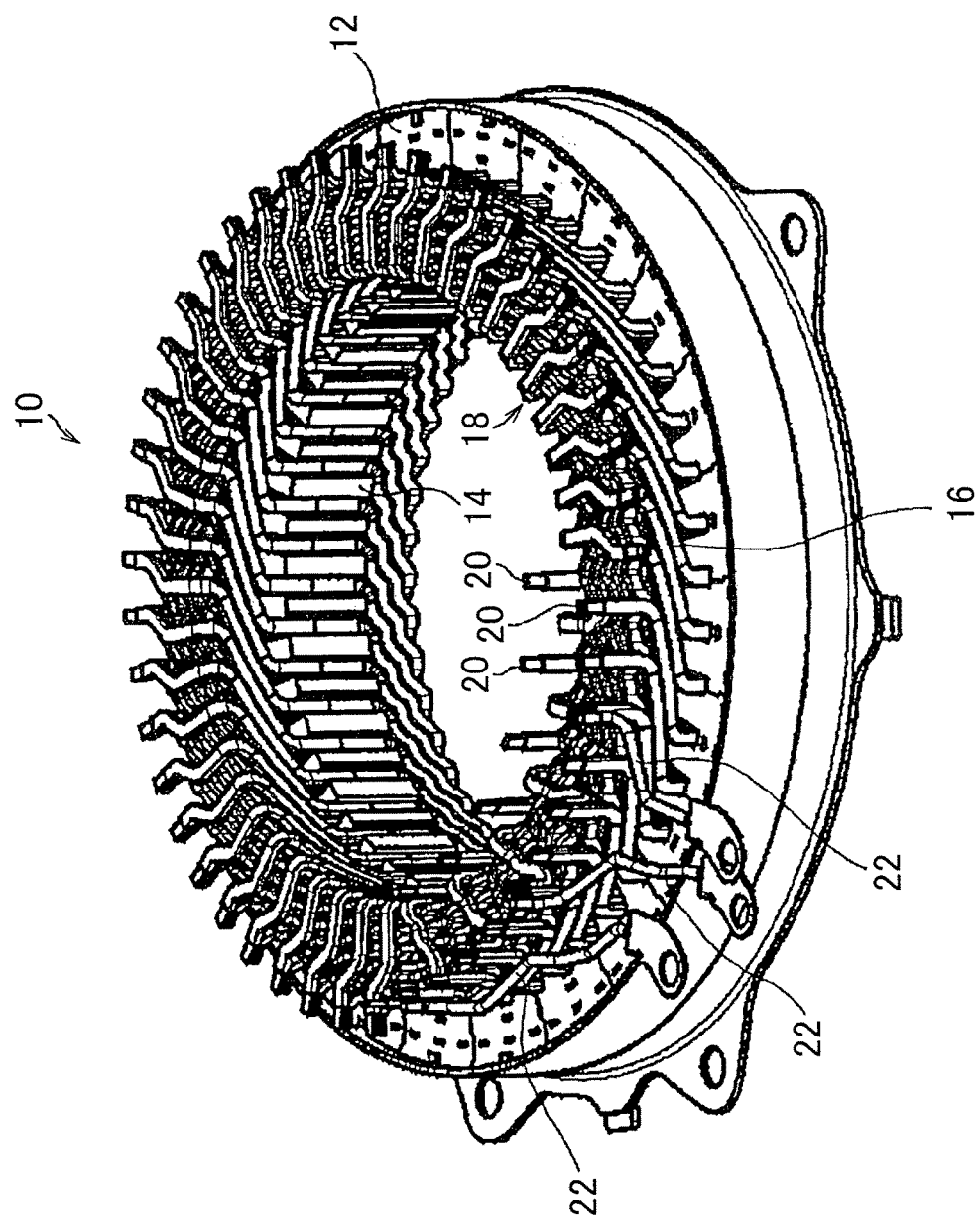
FIG. 1 is a perspective view that shows a stator for a rotary electric machine.

An embodiment of the present invention will be described below with reference to the drawings. FIG. 1 is a perspective view that shows the appearance of a stator 10 for a rotary electric machine. The stator 10 includes a stator core 12 that has a generally annular or cylindrical shape. Teeth 14 that serve as magnetic poles are arranged in the circumferential direction along the inner circumference of the stator core 12. A coil group 18 is mounted on the stator core 12 with coil conductors 16 wound around the teeth 14. In the embodiment, a plurality of coil conductors 16 that are formed in a predetermined shape are inserted into slots which are spaces between the teeth 14, and the coil conductors 16 are welded to each other to form a predetermined number of partial coils. Then, respective ends of the coil conductors 16 which form the partial coils are connected to each, other via bus bars to be discussed later to form the coil group 18.

The stator 10 has an annular or cylindrical shape even with the coil group 18 mounted on the annular or cylindrical stator core 12. The annular or cylindrical shape of the stator 10 etc. will hereinafter be referred to as "annular" for simplicity. A rotor (not shown) is disposed inside the annular stator 10. When electric power is supplied to the coil group 18, a rotating magnetic field is generated in a space inside the annular stator 10, and the rotor is rotated through interaction with the magnetic field. The axis of rotation of the rotor serves as the rotational axis of the rotary electric machine, and coincides with the center axis of the annular stator 10. In the following description, the rotational axis of the rotary electric machine, that is, the direction in which the center axis of the annular stator 10 extends, will be referred to as a "rotational axis direction".

As shown in FIG. 1, the ends of the coil conductors 16 project upward of FIG. 1, that is, in the rotational axis direction, from the coil group 18. The end portions of the coil conductors 16 that extend from the coil group 18 are referred to as "coil conductor extended end portions (conductor extended portions) 20". In the stator 10, two sets of partial coils are provided for each of U phase, V phase, and W phase, which results in a total of twelve coil conductor extended end portions 20 that are the end portions of each partial coil. For each phase, the respective ends of the coil conductor extended end portions 20 are electrically connected to each other. the respective ends of the coil conductor extended end portions 20 on the neutral point side are electrically connected to each other. A power line 22 that supplies three-phase alternating power is connected to one of the coil conductor extended end portions 20 for each of U phase, V phase, and W phase. The power line 22 also has a function of feeding electric power generated by the rotary electric machine to the outside when the rotary electric machine generates electricity.

Figure 2:
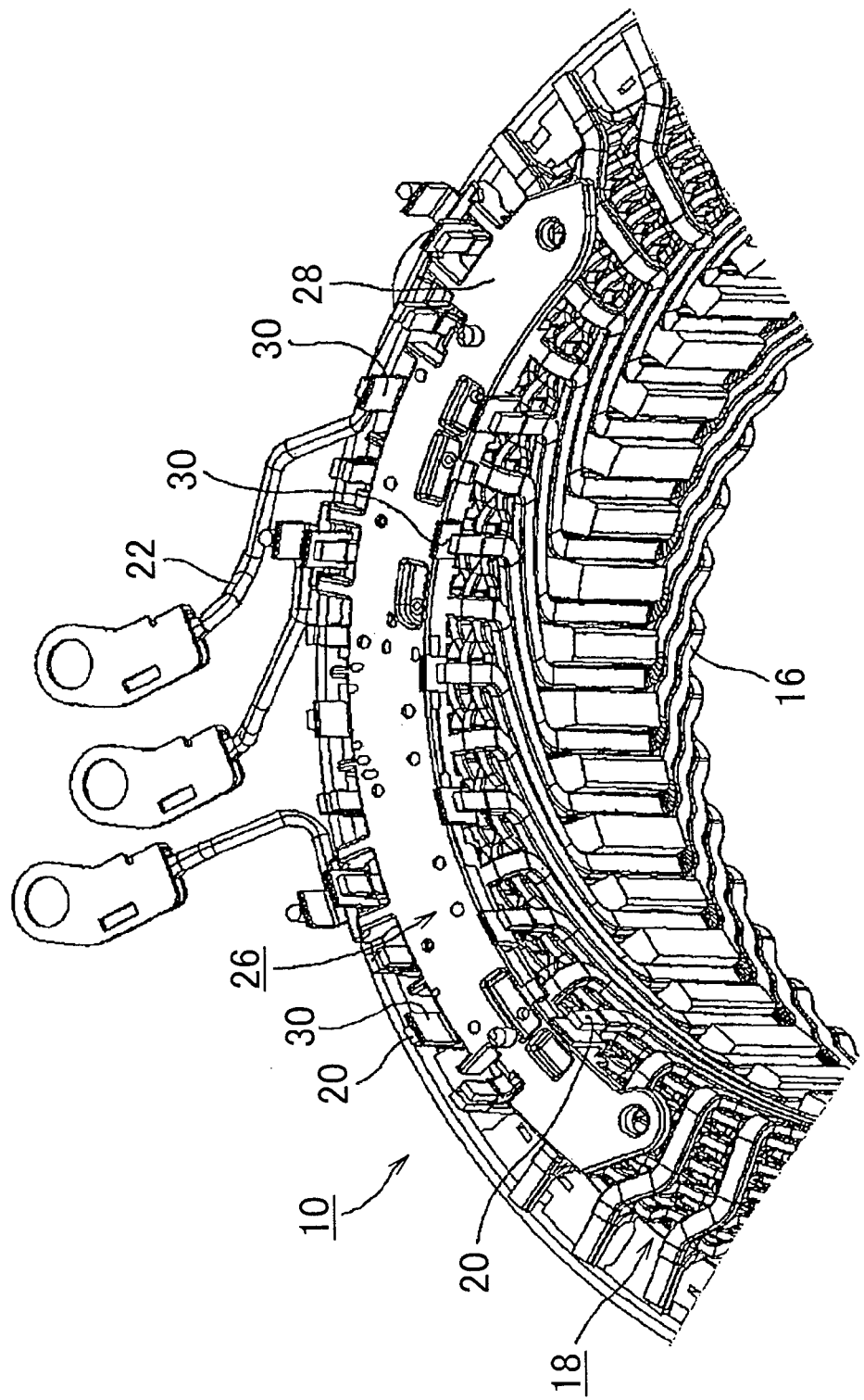
FIG. 2 shows a state in which a bus bar module is mounted on the stator.
Figure 3:
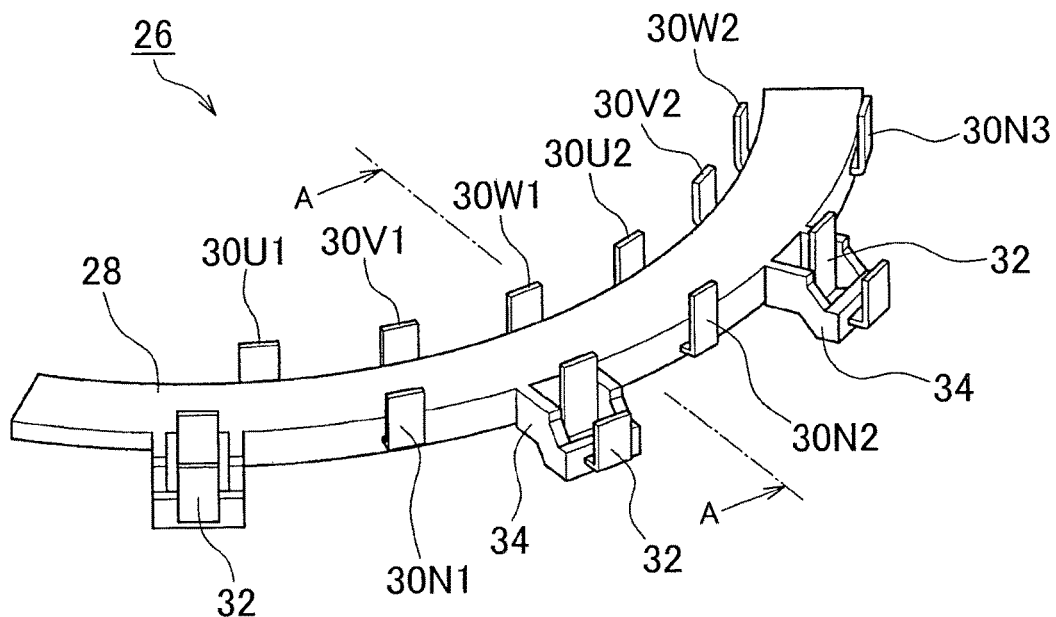
FIG. 3 is a perspective view that shows the bus bar module as a single member.

FIGS. 2 and 3 show a bus bar module 26 that is formed by integrating a plurality of bus bars that connect the coil conductors 16 for each phase. FIG. 2 shows the bus bar module 26 as mounted on the stator 10. FIG. 3 is a schematic view that shows the bus bar module 26 as a single member.

The bus bar module 26 is disposed at a side of the stator 10 that is not the inner circumferential side or the outer circumferential side, in particular adjacent to the coil group 18, in the rotational axis direction. The bus bar module 26 includes a bus bar module main body (module main body) 28 that extends in an arcuate shape along the annular shape of the stator 10, and terminals 30 that project from the main body 28 to be connected to the coil conductor extended end portions 20. A plurality of bus bars that extend along the arcuate shape of the main body 28 are disposed in the bus bar module main body 28. The end portions of the bus bars project from the bus bar module main body 28 to form the terminals 30. The terminals 30 will be referred to as "bus bar extended end portions 30". The bus bar extended end portions 30 project from side surfaces of the bus bar module main body 28, that is, the surfaces facing the direction to cross the longitudinal of the bus bar module, main body 28. In the stator 10, the bus bar extended end portions 30 project from side surfaces of the bus bar module main body 28 that are opposite to each other, in particular, from a side surface of the outer circumferential side of the arcuate bus bar module main body 28 and from a side surface of the inner circumferential side of the arcuate bus bar module main body 28.

Further, holding portions 34 that hold connection plates 32 to be connected to the power line 22 by welding etc. are provided to project from the bus bar module main body 28 (see FIG. 3). Three connection plates 32 are provided to correspond to the number of the phases. The dimension in the radial direction, that is, width, of the bus bar module main body 28 is equal to or less than the width of the coil group 18 in the radial direction. The width of the entire bus bar module 26 which includes the holding portions 34 is also within the width of the stator core 12.

The coil group 18 of the stator 10 is formed by connecting two partial coils for each phase using a bus bar. One end of each coil conductor from the two partial coils is connected to the bus bar. The other end of the coil conductor from one of the partial coils is connected to the neutral point. The other end of the coil conductor from the other partial coil is connected to the power line 22.

A more specific description will be made with reference to FIG. 3. The bus bar extended end portions 30 to be connected to the coil conductors 16 for U phase are indicated by symbols 30U1 and 30U2. The bus bar extended end portions 30 to be connected to the coil conductors 16 for V phase are indicated by symbols 30V1 and 30V2. The bus bar extended end portions 30 to be connected to the coil conductors 16 for W phase are indicated by symbols 30W1 and 30W2. The terminals to be connected to the neutral point ends of the coil conductors 16 for each phase are indicated by symbols 30N1, 30N2, and 30N3. For one of the two partial coils for U phase, one end of the coil conductor of the partial coil is connected to the bus bar extended end portion 30U1, and the other end of the coil conductor of the same partial coil is connected to the bus bar extended end portion 30N1 on the neutral point side. For the other partial coil for U phase, one end of the coil conductor of the partial coil is connected to the bus bar extended end portion 30U2, and the other end of the coil conductor of the same partial coil is connected to the connection plate 32. The same applies to the partial coils for V phase and W phase.

The holding portions 34 which hold the connection plates 32 are provided on the outer circumferential side of the bus bar module 26. One end of the coil conductor 16 is connected to the connection plate 32. The connection plate 32 has a generally J shape, for example, and held with its shorter portion from the J shape bend facing out toward the circumference. The power line 22 is connected to the shorter portion of the connection plate 32. The other coil conductor 16 for each phase is connected to the longer portion of the connection plate 32.

Figure 4:
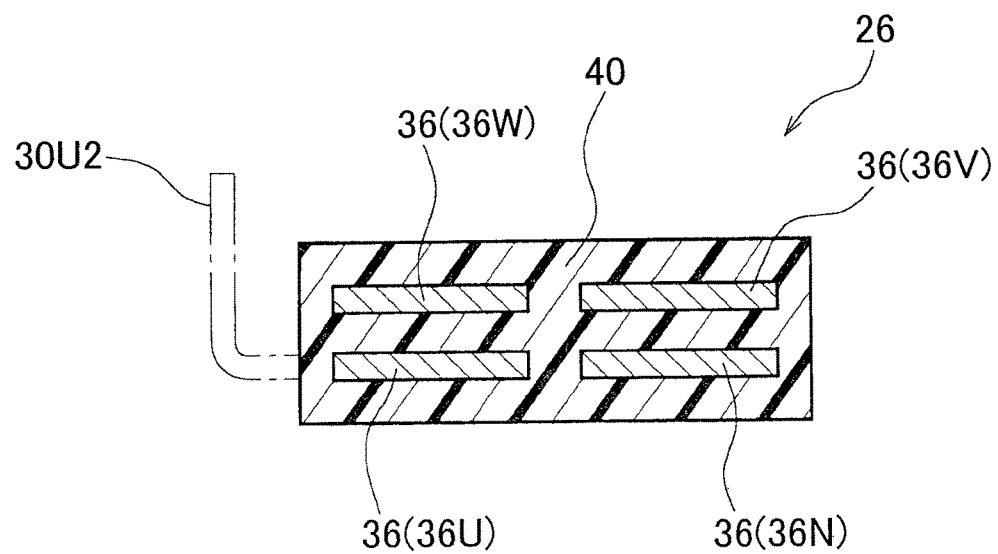
FIG. 4 is a cross-sectional view of the bus bar module taken along the line A-A of FIG. 3.
Figure 5:
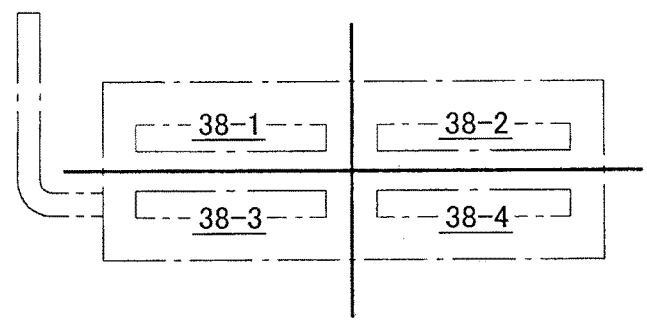
FIG. 5 illustrates partitions 38 that house bus bars.

FIG. 4 is a cross-sectional view of the bus bar module 26 taken at a position at which four bus bars 36 corresponding to U phase, V phase, W phase, and the neutral point are disposed side by side with each other. For example, this is a cross-sectional view taken along the line A-A of FIG. 3. The four bus bars 36 are arranged in a 2-by-2 configuration with two, upper and lower, layers and two, left and right, rows. Herein, the up-down direction is defined as the rotational axis direction of the rotary electric machine, with the side that is closer to the stator defined as the lower side and the side that is farther from the stator defined as the upper side. In addition, the left-right direction is defined as the direction that is orthogonal to the rotational axis, that is, the radial direction of the rotary electric machine, with the left side defined as the inner side of the rotary electric machine and the right side defined as the outer side of the rotary electric machine. The directions mentioned above are defined for convenience of description, and are not related to the directions and orientations that are used in actual installation of the device. In the case where it is necessary to differentiate the four bus bars 36, the bus bars 36 for U phase, V phase, W phase, and the neutral point are indicated by symbols 36U, 36V, 36W, and 36N, respectively. As shown in the drawing, the bus bar 36U for U phase is disposed in the lower layer of the left row, the bus bar 36V for V phase is disposed in the upper layer of the right row, the bus bar 36W for W phase is disposed in the upper layer of the left row, and the bus bar 36N for the neutral point is disposed in the lower layer of the right row. Further, each of the four regions in the 2-by-2 configuration is referred to as a "partition 38". As shown in FIG. 5, among the four partitions 38, the partition in the upper layer of the left row is denoted by 38-1, the partition in the upper layer of the right row is denoted by 38-2, the partition in the lower layer of the left row is denoted by 38-3, and the partition in the lower layer of the right row is denoted by 38-4.

The bus bar module 26 includes an insulating member 40 that insulates the bus bars 36 from each other and that covers the bus bars 36 to insulate the bus bars 36 from the outside. The insulating member 40 may be a molded resin article, for example, and integrates the bus bars 36U, 36V, 36W, and 36N with each other by molding. In the drawing, the insulating member 40 is shown as a single member. For convenience of the molding process, however, the insulating member 40 may be divided into two or more members. For example, a central part of the insulating member 40 having a cross-shaped cross-section may be molded first, the bus bars 36 may then be mounted on the cross-shaped part, and the resulting assembly may further be molded with a resin.

Figure 6A:
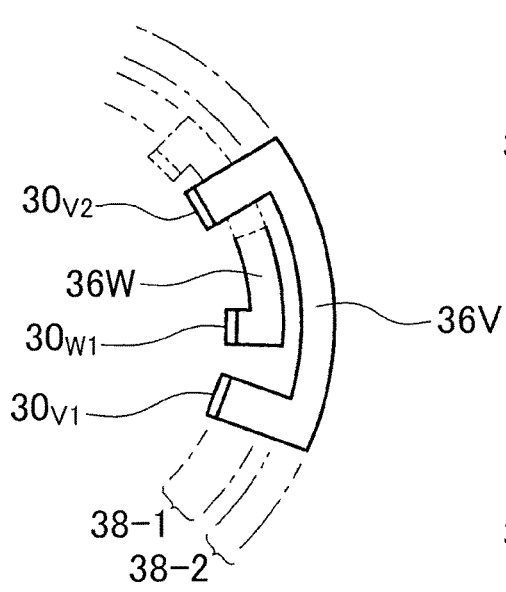
FIG. 6A and FIG. 6B show the shape of the bus bars and the arrangement of the bus bars in the bus bar module.
Figure 6B:
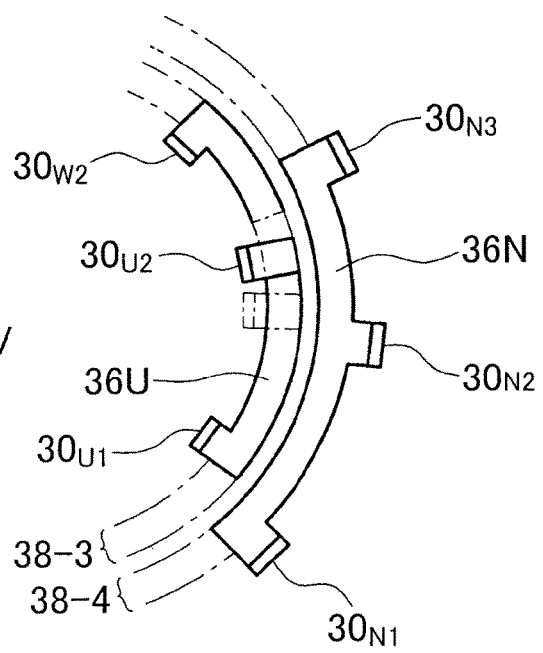

FIGS. 6A and 6B show the respective shapes of the bus bars 36U, 36V, 36W, and 36N. FIG. 6A shows the upper layer, that is, the layer to which the partitions 38-1 and 38-2 belong. FIG. 6B shows the lower layer, that is, the layer to which the partitions 38-3 and 38-4 belong. Each of the bus bars 36U, 36V, 36W, and 36N are a plate member fabricated to have generally the shape of an arc with its plate surface positioned within a plane defined by the arc. The bus bar extended end portions 30 are provided at both ends of the arc, or at both ends and an intermediate position of the arc. The bus bar 36U for U phase is disposed in the partition 38-3 in the lower layer of the left row. The bus bar 36V for V phase is disposed in the upper layer, and extends from the terminal 30V1 across the partition 38-1 in the left row, passes through the partition 38-2 in the right row, and extends across the partition 38-1 in the left row again to reach the terminal 30V2. The bus bar 36W for W phase extends from the terminal 30W1 along the partition 38-1, moves from the upper layer to the lower layer at a position past the terminal 30U2, and passes through the partition 38-3 to reach the terminal 30W2. The bus bar 36N for the neutral point extends through the partition 38-4 in the lower layer of the right row. In this way, the four bus bars 36 are arranged in the bus bar module main body 28 in two layers, upper and lower, that include two bus bars 36 each, and in two parallel rows, left and right, that include two bus bars 36 each.

Figure 7:
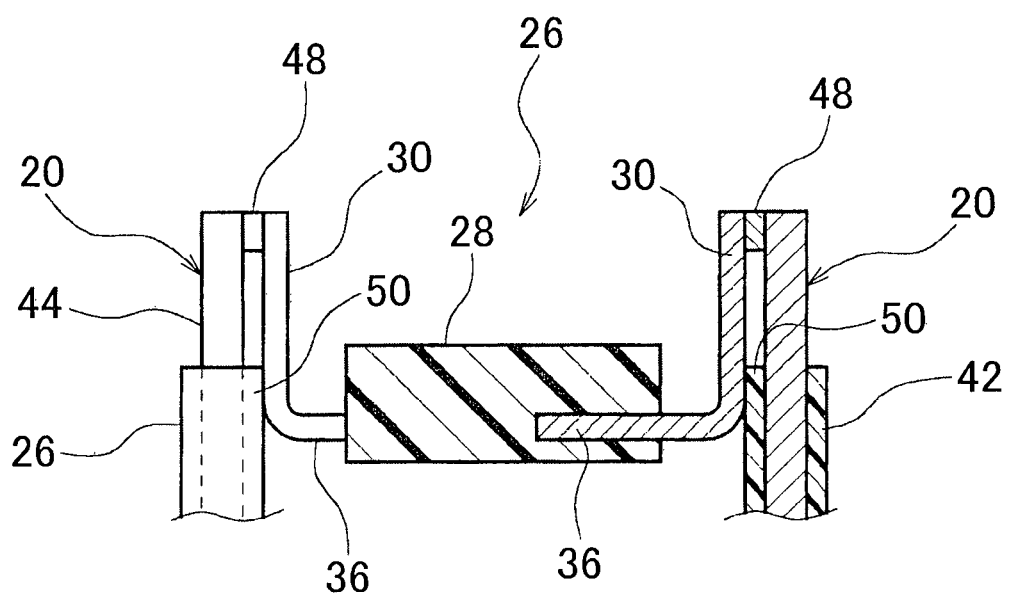
FIG. 7 shows how coil conductor extended end portions and bus bar extended end portions are connected to each other according to an embodiment of the present invention.

FIG. 7 shows how the coil conductor extended end portions 20 and the bus bar extended end portions 30 are connected to each other. For simplicity, only one bus bar 36 is shown in the bus bar module main body 28. The bus bar module main body 28 generally has the shape of an arc that has a rectangular cross section (see FIG. 3). FIG. 7 shows a cross section of the bus bar module main body 28 that is orthogonal to the direction in which the arc extends. Also in the description for FIG. 7, the terms "upper", "lower", "left", and "right" have the same meaning as those in the description for FIGS. 4 and 5. The coil group 18 is positioned below the illustration in FIG. 7. The bus bars 36 project leftward or rightward from a side surface of the bus bar module main body 28, and are thereafter bent upward. Portions of the bus bars 36 that extend upward correspond to the bus bar extended end portions 30. The up-down direction in FIG. 7 is defined as the direction in which the rotational axis of the rotary electric machine extends. Hence, the bus bar extended end portions 30 extend in the rotational axis direction. As described above, the coil group 18 is disposed below the bus bar module main body 28 in FIG. 7. Hence, the bus bar extended end portions 30 extend in the direction away from the coil group 18.

The left and right bus bars 36 of the bus bar module main body 28 extend in the same direction, that is, in the rotational axis direction or the direction away from the coil group 18. As a result, the bus bar module 26 has a U shape when viewed in the longitudinal direction.

The coil conductor extended end portions 20 also extend upward in FIG. 7, that is, in the rotational axis direction, and are disposed adjacently along the bus bar extended end portions 30 to which the coil conductor extended end portions 20 are to be connected. As with the bus bar extended end portions 30, the coil conductor extended end portions 20 also extend in the direction away from the coil group 18. Element wire portions 44 with no coating 42 are provided at the respective distal ends of the coil conductor extended end portions 20. As opposed to the element wire portions 44, coated portions of the coil conductor extended end portions 20 are referred to as "coated portions 46".

The respective distal ends of the coil conductor extended end portions 20 and the bus bar extended end portions 30 are connected to each other by welding. In the drawing, welded portions (welds) denoted by numeral 48 are depicted as contacting the coil conductor extended end portion 20 and the bus bar extended end portion 30 via a boundary. Practically, however, the members are fused together, and there is no clear boundary between the members. The bus bar module 26 has a U shape, and is connected to and supported by the coil conductor extended end portions 20 at both ends of the U shape. In the case where the bus bar module 26 is supported only by the welded portions 48, stress concentrates on the welded portions 48 when the bus bar module main body 28 which is positioned at the bottom of the U shape is vibrated by an external excitation. Stress concentration on the welded portions 48 can be suppressed by reducing the vibration amplitude of the bus bar module main body 28, in particular the vibration amplitude of the bus bar module main body 28 with respect to the coil conductor extended end portions 20.

In the stator 10, the vibration amplitude of the bus bar module main body 28 is suppressed by fixing the coil conductor extended end portions 20 and the bus bar extended end portions 30 to each other at positions away from the welded portions 48. Portions at which the coil conductor extended end portions 20 and the bus bar extended end portions 30 are fixed to each other are referred to as "fixed portions 50". The coil conductor extended end portions 20 and the bus bar extended end portions 30 may be fixed to each other by adhesion with a resin. A resin material is disposed between the coil conductor extended end portion 20 and the bus bar extended end portion 30, temporarily melted, and solidified to fix the coil conductor extended end portion 20 and the bus bar extended end portion 30 to each other. The resin which has been temporarily melted is solidified in conformity to the surface of a mating member, resulting in the tight contact with the mating member. After the melting process, the resin is in tight contact with the mating member, and therefore contacts the mating member over a substantially larger area compared to a case where the resin simply contacts the mating member. Thus, even if the contact surfaces are temporarily peeled from each other, the wider contact surfaces can be maintained, effectively supporting the bus bar module 26. The position of the fixation or the support may be spaced apart from the welded portions 48. This allows the coil conductor extended end portions 20 and the bus bar extended end portions 30 not to be fixed to or in tight contact with each other between the welded portions 48 and the fixed portions 50. In the up-down direction in FIG. 7, in particular, the position of the fixation etc. may be at the same position (same height) as the bus bar module main body 28, that is, at a side of the bus bar module main body 28. Also in the rotational axis direction, or in the extending direction of the coil conductor extended end portions 20, the position of the fixation etc. may be at the same position as the bus bar module main body 28.

Further, the resin of the coating 42 of the coil conductor extended end portions 20 may be utilized as the resin for adhesion. In general, an enamel resin is used as a coating resin for coil conductors. As shown in FIG. 7, the coated portion 46 is disposed to overlap (adjacent to) a part of respective portions of the coil conductor extended end portion 20 and the bus bar extended end portion 30 where they extend side by side, for example at a side of the bus bar module main body 28. Then, adhesion can be performed by melting the coating resin utilizing heat that is produced when the coil conductor extended end portion 20 and the bus bar extended end portion 30 are welded to each other. Examples of the resin include engineering plastics and super engineering plastics.

Projections and depressions or holes may be formed in the surface of the bus bar extended end portion 30 for more stable coupling with the resin.

The invention claimed is:

1. A stator for a rotary electric machine, the stator comprising:
   a stator core;
   a plurality of partial coils made from coil conductors, the plurality of partial coils being mounted on the stator core; and
   a plurality of bus bars connecting the coil conductors of the partial coils to form a coil group, the plurality of bus bars being integrated with each other to form a module main body, and the plurality of bus bars including end portions extending from one side surface of the module main body and a side surface of the module main body opposite to the one side surface;
   wherein the module main body is disposed adjacent to the coil group in a rotational axis direction of the rotary electric machine;
   the coil conductors each include a conductor extended portion provided at end portions of the coil conductors to extend in the rotational axis direction and in a direction away from the coil group;
   the bus bars each include a bus bar extended portion provided at the end portions of the bus bars to extend in the rotational axis direction and in the direction away from the coil group;
   the conductor extended portion and the bus bar extended portion are disposed adjacent to each other;
   the conductor extended portion and the bus bar extended portion include a weld provided between the conductor extended portion and the bus bar extended portion;
   the conductor extended portion and the bus bar extended portion are adhered to each other with a resin at a position away from the weld and brought into tight contact with each other with the resin along a surface of the bus bar extended portion at the position away from the weld to support the module main body by the conductor extended portion;
   a portion of each coil conductor is coated with the resin, which adheres to the conductor extended portion and the bus bar extended portion; and
   the weld, which connects the conductor extended portion and the bus bar extended portion, is not in contact with the resin.

2. The stator according to claim 1, wherein
   a position in the rotational axis direction at which the conductor extended portion and the bus bar extended portion are adhered to each other, or a position in the rotational axis direction at which the module main body is supported by the conductor extended portion, overlaps a position of the module main body in the rotational axis direction.

3. A stator for a rotary electric machine, the stator comprising:

a stator core;

a plurality of partial coils made from coil conductors, the plurality of partial coils being mounted on the stator core; and a plurality of bus bars connecting the coil conductors of the partial coils to form a coil group, the plurality of bus bars being integrated with each other to form a module main body, and the plurality of bus bars including end portions extending from the module main body;

wherein the module main body is disposed adjacent to the coil group;

the coil conductors each include a conductor extended portion provided at end portions of the coil conductors to extend in a direction away from the coil group;

the bus bars each include a bus bar extended portion provided at the end portions of the bus bars;

the bus bar extended portion extends along the conductor extended portion in the same direction as the direction of the conductor extended portion;

the conductor extended portion and the bus bar extended portion include a weld provided between the conductor extended portion and the bus bar extended portion;

the conductor extended portion and the bus bar extended portion are fixed to each other with a resin at a position away from the weld and brought into tight contact with each other with the resin along a surface of the bus bar extended portion at the position away from the weld to support the module main body by the conductor extended portion;

a portion of each coil conductor is coated with the resin, which adheres to the conductor extended portion and the bus bar extended portion; and the weld, which connects the conductor extended portion and the bus bar extended portion, is not in contact with the resin.

4. The stator according to claim 3, wherein
the conductor extended portion and the bus bar extended portion are fixed to each other by adhesion with the resin that coats the coil conductors.

5. The stator according to claim 3, wherein
a position at which the conductor extended portion and the bus bar extended portion are fixed to each other in an extending direction of the conductor extended portion overlaps a position of the module main body in the extending direction of the conductor extended portion.

6. The stator according to claim 1, wherein
an end portion of the conductor extended portion and an end portion of the bus bar extended portion are welded to each other at the weld.

7. The stator according to claim 1, wherein
the resin is disposed at the same vertical position as the module main body.

8. The stator according to claim 1, wherein
a surface of the bus bar extended portion includes at least one of projections or depressions in an area where the resin is disposed.

9. The stator according to claim 3, wherein
the resin is disposed at the same vertical position as the module main body.

10. The stator according to claim 3, wherein
a surface of the bus bar extended portion includes at least one of projections or depressions in an area where the resin is disposed.

* * * * *